US006769815B2

(12) United States Patent
Imazu

(10) Patent No.: US 6,769,815 B2
(45) Date of Patent: Aug. 3, 2004

(54) OPTICAL CONNECTOR AND SHIELD CASE

(75) Inventor: Hitoshi Imazu, Nagoya (JP)

(73) Assignees: Autonetworks Technologies, Ltd., Mie (JP); Sumitomo Wiring Systems, Ltd., Mie (JP); Sumitomo Electric Industries, Ltd., Osaka (JP)

( * ) Notice: Subject to any disclaimer, the term of this patent is extended or adjusted under 35 U.S.C. 154(b) by 104 days.

(21) Appl. No.: 10/108,446

(22) Filed: Mar. 29, 2002

(65) Prior Publication Data

US 2002/0141710 A1 Oct. 3, 2002

(30) Foreign Application Priority Data

Mar. 30, 2001 (JP) ........................................ 2001-098724

(51) Int. Cl.⁷ ................................................ G02B 6/36
(52) U.S. Cl. ........................................ 385/88; 385/90
(58) Field of Search ............................... 385/88, 92, 90

(56) References Cited

U.S. PATENT DOCUMENTS 5,047,835 A * 9/1991 Chang ......................... 257/433
5,971,811 A   10/1999 Mori et al.
6,062,738 A    5/2000 Braquet et al.

FOREIGN PATENT DOCUMENTS

| JP | 58-090607 A | 5/1983 |
| JP | 59-229520 A | 12/1984 |
| JP | A 2000-56186 | 2/2000 |

* cited by examiner

Primary Examiner—Vip Patel
Assistant Examiner—Sumati Krishnan
(74) Attorney, Agent, or Firm—Oliff & Berridge, PLC

(57) ABSTRACT

In a state where an optical connector is mounted and fixed to a circuit board, a grounding piece 12 formed on a shield case 10 is pressed against a grounding wiring pattern formed on the circuit board by a fixing piece formed on a connector housing. A spring piece 13 is formed by cutting and raising a part of the grounding piece 12 into a strip-like shape while remaining another part to be uncut, and then bending the raised part into a substantially V-like shape. In the state where the optical connector is mounted and fixed to the circuit board, the spring piece 13 is interposed between the fixing piece and the circuit board while being elastically deformed to be flattened.

5 Claims, 3 Drawing Sheets

OPTICAL CONNECTOR AND SHIELD CASE

BACKGROUND OF THE INVENTION

The present invention relates to an optical connector and a shield case which are useful in the field of optical communication for OA, FA, vehicle apparatuses, and the like.

A related optical connector which accommodates and holds an optical element D such as a light emitting element or a light receiving element is shown in FIG. 5.

In the optical connector, in order to improve the noise resistance of the optical element D against external noises and suppress radiative noises from the optical element D, the optical element D is accommodated in a metal shield case 101 and then mounted into a connector housing 105 which is made of a resin.

A lead terminal 102 downward elongates from the shield case 101. When the optical connector is mounted and fixed to a circuit board P, the lead terminal 102 is passed through a through hole Ps formed in the circuit board P, and then soldered to a grounding wiring pattern formed on the lower face of the circuit board, whereby the shield case 101 is grounded.

A pair of fixing pieces 106 each having a screw hole 106h are formed on rear portions of both the sides of the connector housing 105, respectively, and screw through holes Ph are formed in the circuit board P. In a state where the connector housing 105 is placed on the circuit board P, screws S are passed from the lower side of the circuit board P through the screw through holes Ph, whereby the optical connector is mounted and fixed to the circuit board P.

In the optical connector, in order to improve the shielding performance of the shield case 101, it is required to lower the grounding resistance of the shield case 101.

As a configuration which can satisfy the requirement, a configuration may be employed in which a plurality of lead terminals 102 are disposed on the shield case 101 and the plurality of lead terminals 102 are soldered to grounding wiring patterns on the circuit board P.

In this case, the grounding wiring patterns to which the lead terminals 102 are to be soldered must be formed on the rear face of the circuit board P. This increases the restriction imposed on the circuit design.

When the optical connector is to be mounted and fixed to the circuit board P, the plural lead terminals 102 must be passed through through holes Ps formed in the circuit board P, respectively, thereby causing a problem in that the workability of mounting and fixing the optical connector is low.

Therefore, it may be contemplated to employ an optical connector which is configured in the following manner. A pair of plate-like grounding pieces are formed on both the side edges of the shield case 101 so as to overlap with the lower sides of the fixing pieces 106, respectively. When the fixing pieces 106 are to be screwed and fixed to the circuit board P, the grounding pieces are interposed between the fixing pieces 106 and the circuit board P to be in surface contact with the grounding wiring patterns formed on the circuit board P, respectively.

This optical connector is configured so that the grounding pieces are in surface contact with the grounding wiring patterns Therefore, the grounding resistance of the shield case 101 can be lowered without forming a plurality of lead terminals 102 on the shield case 101.

In the case where such grounding pieces are curved or bent to have problems in flatness and distortion, or the pair of grounding pieces are relatively shifted or twisted, however, the electrical and thermal connecting states between the shield case 101 and the grounding wiring patterns are impaired and the attaching state becomes unstable. In such a case, when the screws are compulsorily fastened by applying a strong force in order to cause the grounding pieces to be firmly in surface contact with the grounding wiring patterns, an excessive force is applied to the shield case 101, the optical element D, and the connector housing 105, thereby producing problems that the optical axis is deviated, and the such components are damaged. Therefore, such compulsive screw fastening cannot be conducted.

SUMMARY OF THE INVENTION

It is an object of the invention to provide an optical connector and a shield case in which electrical and thermal connecting states between a shield case and a grounding wiring pattern of a circuit board can be improved and stable attachment can be conducted without disposing a plurality of leads.

In order to solve the problem, an optical connector of a first aspect of the invention is an optical connector in which a plate-like grounding piece is formed on a shield case that is capable to accommodate an optical element, a plate-like fixing piece is formed so as to overlap with the grounding piece, on a connector housing that is capable to accommodate the shield case, and, in a state where the optical connector is mounted and fixed to a circuit board, the grounding piece is pressed against the circuit board by the fixing piece, wherein at least one spring piece is formed by cutting, raising, and bending a part of the grounding piece, the spring piece being elastically deformable to be flattened in a raising region between the circuit board and the fixing piece.

In a second aspect of the invention, the spring piece has a shape which is obtained by cutting and raising the part of the grounding piece in a strip-like shape, and bending an intermediate portion in a longitudinal direction of the raised part into a substantially V-like shape.

In a third aspect of the invention, a plated layer is formed on a portion of the spring piece, the portion being to be in contact with a wiring pattern of the circuit board.

A shield case of a fifth aspect of the invention is a shield case which is capable to accommodate an optical element, wherein a plate-like grounding piece which is to be pressed against a circuit board is formed, and at least one spring-like projection is formed on the grounding piece by cutting, raising, and bending a part of the grounding piece.

DETAILED DESCRIPTION OF THE PREFERRED EMBODIMENTS

Hereinafter; an optical connector which is an embodiment of the invention will be described.

Figure 1:
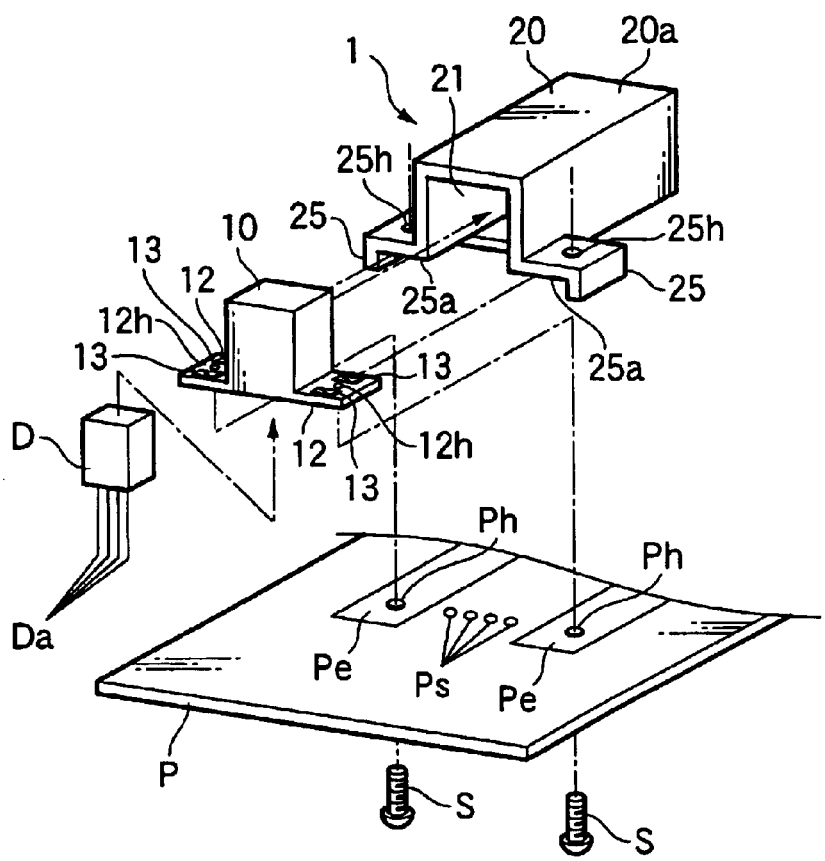
FIG. 1 is an assembly perspective view showing an optical connector which is an embodiment of the invention.

In the optical connector 1, as shown in FIG. 1, plate-like grounding pieces 12 are formed on a shield case 10 which can accommodate an optical element (a light emitting element or a light receiving element) D, and plate-like fixing pieces 25 are formed so as to overlap respectively with the grounding pieces 12, on a connector housing 20 which can accommodate the shield case 10. The optical connector is configured so that, in a state where the optical connector is mounted and fixed to a circuit board P, the grounding pieces 12 are pressed against the circuit board P by the fixing pieces 25, The shield case 10 is formed by an electrically conductive material such as a metal, and into a substantially box-like shape in which the bottom is opened, so that the optical element D can be accommodated in the case. In the shield case 10, an optical coupling portion (a light emitting portion or a light receiving portion) of the optical element D faces the outside through a window which is formed in the front face of the shield case 10.

The connector housing 20 is formed into a substantially rectangular parallelepiped box-like shape. An accommodating recess 21 which can accommodate the shield case 10 is formed inside a rear part of the housing. The accommodating recess 21 is configured so that the recess is opened in the back and bottom sides of the connector housing 20, and the shield case 10 can be accommodated and held in the accommodating recess 21 through the back-side opening. Leads Da of the optical element D downward elongate below the connector housing 20 with passing through the bottom-side openings of the shield case 10 and the accommodating recess 21.

A front portion of the connector housing 20 is formed as a fitting tubular portion 20a which is forward opened, and configured so that, when a counter optical connector is fitted into the fitting tubular portion 20a to be connected therewith, an optical fiber held by the counter optical connector is guided to the optical coupling portion of the optical element D through the window of the shield case 10.

A pair of plate-like grounding pieces 12 are formed on lower edges of both the side faces of the shield case 10 so as to be outward projected therefrom, respectively. A pair of thick plate-like fixing pieces 25 are formed on lower edges of a rear portion of the connector housing 20 so as to be outward projected therefrom, respectively. Recesses 25a having a shape corresponding to the respective grounding pieces 12 are formed in the lower faces of the fixing pieces 25, respectively. When the shield case 10 is accommodated into the accommodating recess 21, the grounding pieces 12 are accommodated in the recesses 25a, respectively and the grounding pieces 12 and the fixing pieces 25 are overlappingly placed. A screw hole 25h is formed in each of the fixing pieces 25, and a screw through hole 12h is formed in each of the grounding pieces 12.

By contrast, grounding wiring patterns Pe are formed on the mounting face of the circuit board P and in portions which correspond to the grounding pieces 12 in the state where the optical connector 1 is mounted and fixed to the circuit board, and screw through holes Ph are formed in portions which correspond to the screw holes 25h and the screw through holes 12h, respectively.

In the state where the optical connector 1 is placed on the mounting face of the circuit board P, screws S are passed from the lower side of the circuit board P through the screw through holes Ph and the screw through holes 12h, and then screwed into the screw holes 25h. As a result, the optical connector 1 is placed and fixed onto the circuit board P in the state where the shield case 10 is accommodated and fixed into the connector housing 20. At this time, in the respective recesses 25a, the grounding pieces 12 are interposed between the circuit board P and the respective fixing pieces 25 to be pressed against the grounding wiring patterns Pe on the circuit board P.

Figure 2:
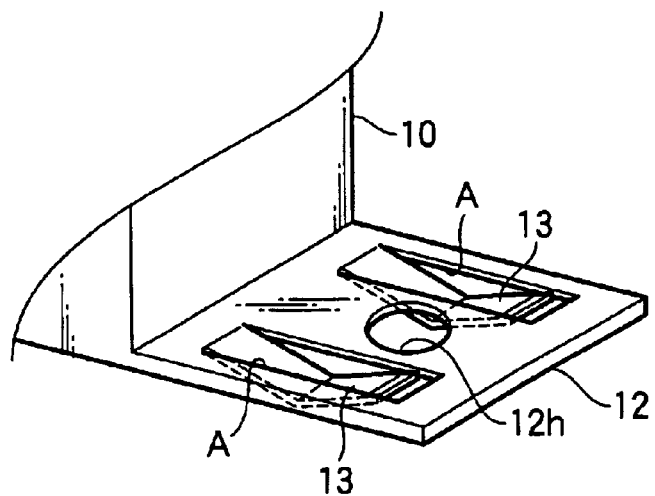
FIG. 2 is a partial enlarged perspective view showing a grounding piece of the optical connector.

As shown in FIGS. 1 and 2, a part of each of the grounding pieces 12 is cut, raised, and bent, thereby forming at least one spring piece 13 which is elastically deformable to be flattened in the raising region A between the circuit board P and the corresponding fixing piece 25.

In the embodiment, parts of each of the grounding pieces 12 in front and rear of the screw through hole 12h are cut and raised into a strip-like shape while maintaining the part on the root side of the grounding piece 12 to be connected thereto, and intermediate parts in the longitudinal direction of the raised parts are downward bent into a substantially V-like shape to form the spring pieces 13.

The thus configured optical connector 1 is mounted and fixed to the circuit board P in the following manner.

Figure 3:
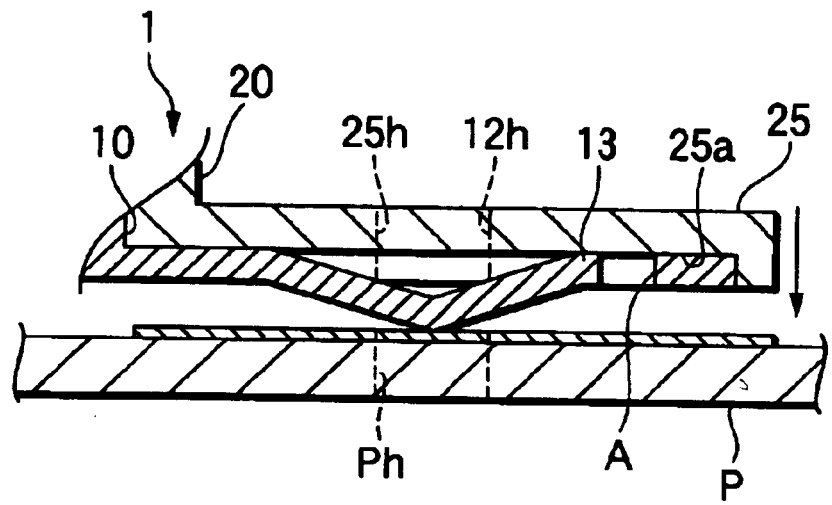
FIG. 3 is a partial enlarged section view showing an intermediate step of mounting and fixing the optical connector to a circuit board.

First, the optical element D is accommodated in the shield case 10, and the shield case 10 is then accommodated in the accommodating recess 21 of the connector housing 20. At this time, the grounding pieces 12 are accommodated in the recesses 25a of the fixing pieces 25 to be overlappingly placed below the lower faces of the fixing pieces 25, respectively. The leads Da of the optical element D are passed through the through holes Ps formed in the circuit board P, and the screw through holes 12h of the grounding pieces 12 and the screw holes 25h of the fixing pieces 25 are placed above the screw through holes Ph of the circuit board P, respectively. As a result, as shown in FIG. 3, the grounding pieces 12 are placed on the grounding wiring patterns Pe on the circuit board P, respectively. In this state, the leads Da are adequately soldered to signal wiring patterns formed on the lower face of the circuit board P, and the screws S are passed from the lower side of the circuit board P through the screw through holes Ph and 12h, and then screwed into the screw holes 25h. Thereafter, the screws S are fastened by a predetermined fastening force against the elastic force by which the spring pieces 13 try to maintain their substantially V-like shape.

Figure 4:
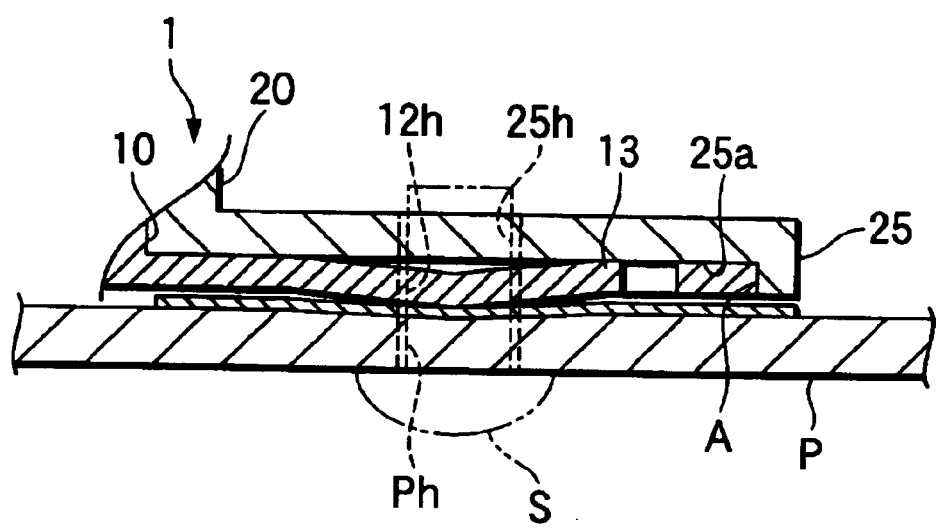
FIG. 4 is a partial enlarged section view showing a state where the optical connector is mounted and fixed to the circuit board.
Figure 5:
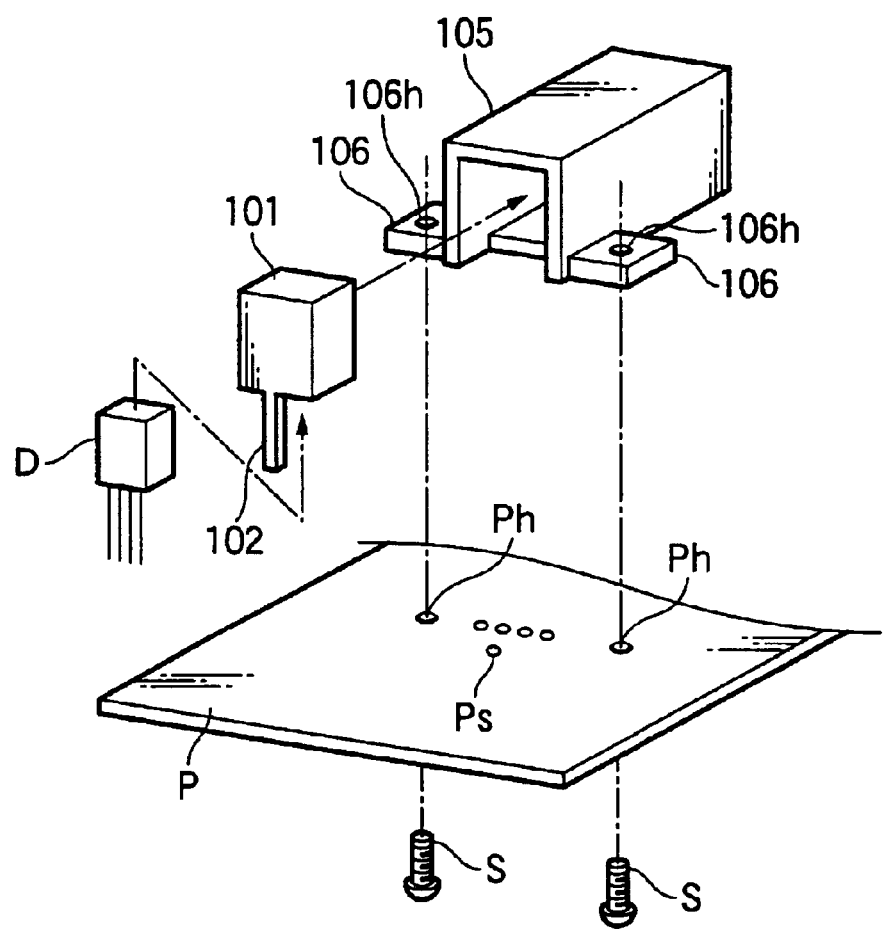
FIG. 5 is an assembly perspective view showing a conventional optical connector.

As shown in FIG. 4, the optical connector 1 is then mounted and fixed onto the circuit board P in the state where the shield case 10 is accommodated in the accommodating recess 21 of the connector housing 20. At this time, a state is formed in which the grounding pieces 12 are sandwiched between the upper faces of the wiring patterns Pe on the circuit board P, and the lower faces of the fixing pieces 25 in the accommodating recess 21, respectively, and the spring pieces 13 are interposed between the upper faces of the wiring patterns Pe on the circuit board P, and the lower faces of the fixing pieces 25 in the accommodating recess 21, while being elastically deformed to be flattened in the raising regions A of the grounding pieces 12, respectively.

When the thus configured optical connector 1 is mounted and fixed to the circuit board P while the grounding pieces 12 of the shield case 10 are pressed against the circuit board P by the fixing pieces 25 of the connector housing 20, the spring pieces 13 are interposed between the fixing pieces 25 and the circuit board P in the state where the spring pieces 13 are elastically deformed to be flattened. Even when the grounding pieces 12 are curved or bent to have problems in flatness and distortion, or the pair of grounding pieces 12 are relatively shifted or twisted, therefore, the electrical and thermal resistances between the shield case 10 and the circuit board P can be reduced because the spring pieces 13 are strongly pressed against the wiring patterns Pe of the circuit board P, whereby the electrical and thermal connecting states between the case and the board can be improved. The improved electrical connecting state enhances the shielding effect for electromagnetic waves by the shield case 10. Furthermore, the improved thermal connecting state allows heat generated by the optical element D to be easily transmitted from the shield case 10 to the wiring patterns Pe via the grounding pieces 12, so that the effect of dissipating the heat generated by the optical element D is enhanced.

In the state where the optical connector is attached to the circuit board P, the spring pieces 13 are elastically deformed between the circuit board and the fixing pieces 25 so as to be flattened in the respective raising regions A for the spring pieces 13. Therefore, the grounding pieces 12 are substantially in surface contact with the fixing pieces 25 and the grounding wiring patterns Pe of the circuit board P, and hence the attaching state of the optical connector 1 is stabilized.

The following effect is derived from the above. The optical connector has the configuration in which the production accuracy of the shield case 10 and the like is not required to be enhanced to a degree higher than necessary, and no additional member is used in the shield case 10. Therefore, the production cost can be suppressed to a lower level.

In the embodiment, the two spring pieces 13 are formed in each of the grounding pieces 12. Alternatively, only one spring piece, or three or more spring pieces may be disposed. The spring pieces 13 are formed by cutting and raising parts of each of the grounding pieces 12 into a strip-like shape. The shape is not restricted to this. For example, the spring pieces 13 may be configured by cutting and raising a part of the grounding pieces 12 into a spiral shape, and then bending the raised part into a conical coil spring-like shape.

A plated layer of tin, gold, or the like may be formed at least on a portion of each spring piece 13 which is to be in contact with the corresponding grounding wiring pattern Pe of the circuit board P, i.e., at least on the outer surface of the bent portion of each spring piece 13 that is bent into a substantially V-like shape. According to the configuration, the electrical resistance between the shield case 10 and the wiring pattern Pe can be further lowered so that the electrical connecting state between the components is further improved.

In the thus configured optical connector according to the first to fourth aspects of the invention, when the optical connector is mounted and fixed to the circuit board so that the grounding piece of the shield case is pressed against the circuit board by the fixing piece of the connector housing, the spring piece is interposed between the fixing piece and the circuit board in the state where the spring piece is elastically deformed to be flattened. Therefore, electrical and thermal connecting states between the shield case and a grounding wiring pattern of the circuit board can be improved without disposing a plurality of leads. Since the spring piece is elastically deformed between the circuit board and the fixing piece so as to be flattened in the raising region for the spring piece, the grounding piece is substantially in surface contact with the fixing piece and the grounding wiring pattern of the circuit board, with the result that the attaching state of the optical connector is stabilized.

In the optical connector according to the third aspect of the invention, since a plated layer is formed on a portion of the spring piece which is to be in contact with the wiring pattern of the circuit board, a further improved electrical contact can be attained between the shield case and the wiring pattern.

In the optical connector according to the fourth aspect of the invention, since the fixing piece is screwed and fixed to the circuit board in a state where the grounding piece is interposed between the fixing piece and the circuit board, the optical connector can be mounted and fixed easily and surely to the circuit board.

In the shield case according to the fifth aspect of the invention, when the optical connector is mounted and fixed to the circuit board so that the grounding piece of the shield case is pressed against the circuit board by the fixing piece of the connector housing, the spring piece is interposed between the fixing piece and the circuit board in the state where the spring piece is elastically deformed to be flattened. Therefore, electrical and thermal connecting states between the shield case and a grounding wiring pattern of the circuit board can be improved without disposing a plurality of leads, and the attaching state of the optical connector is stabilized.

What is claimed is:

1. An optical connector comprising:
   a shield case capable to accommodate an optical element,
   a plate-like grounding piece formed on said shield case,
   a connector housing capable to accommodate said shield case,
   a plate-like fixing piece formed on said connector housing to overlap with said grounding piece, wherein
   said grounding piece is pressed against a circuit board by said fixing piece in a state where said optical connector is mounted to be fixed to said circuit board, and
   at least one spring piece is formed from said grounding piece by cutting, raising and bending a part of said grounding piece into a strip-like shape with the spring piece extending beyond the uncut part of the grounding piece so as to be closer to the circuit board than the uncut part, said spring piece being elastically deformable to be flattened in a raising region between said circuit board and said fixing piece.

2. The optical connector according to claim 1, wherein said strip like shape of said spring piece has a first end integrally formed with said grounding piece and a second free end separated from said grounding piece, an intermediate portion of said spring piece being bent to extend below the uncut part of the grounding piece closer to the circuit board than said grounding piece.

3. The optical connector according to claim 1, wherein
   a plated layer is formed on a portion of said spring piece, said portion being in contact with a wiring pattern of said circuit board.

4. The optical connector according to claim 1, wherein
   said fixing piece is screwed to be fixed to said circuit board in a state where said grounding piece is interposed between said fixing piece and said circuit board.

5. The optical connector according to claim 2, wherein said spring piece is V-shaped.

* * * * *